Sept. 2, 1969   B. D. COOK   3,465,155
LASER OUTPUT CONTROL SYSTEM
Filed Sept. 16, 1965
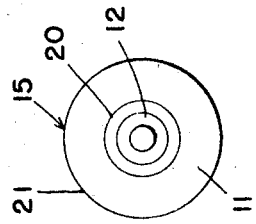
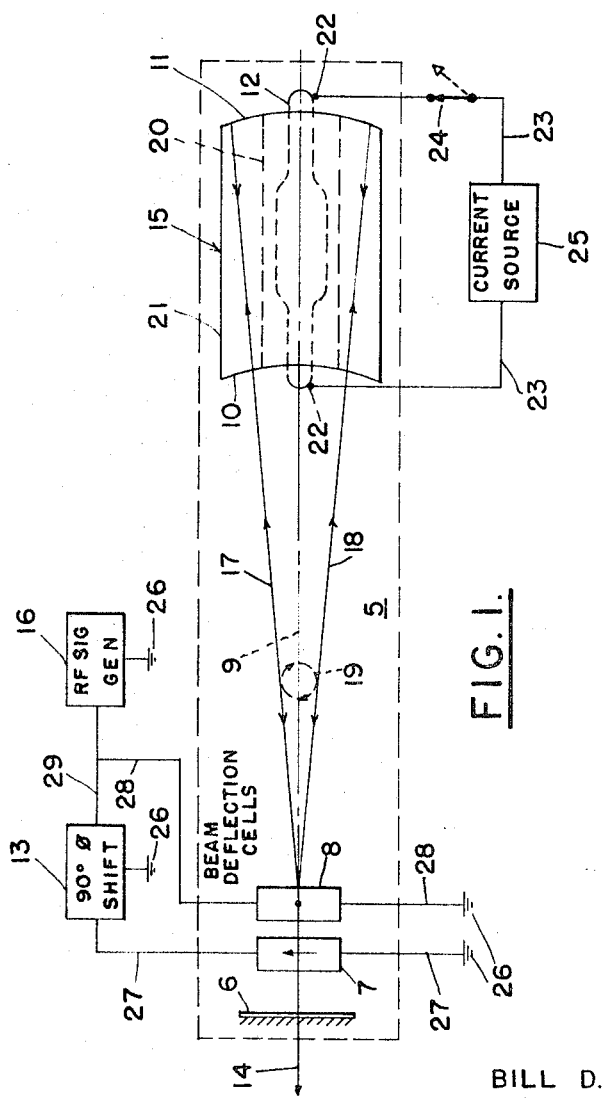
Inventor
BILL D. COOK
By Harry M. Saragovitz,
Edward J. Kelly, Herbert Berl
& S. Dubroff
Attorneys

United States Patent Office 3,465,155
Patented Sept. 2, 1969

3,465,155
LASER OUTPUT CONTROL SYSTEM
Bill D. Cook, Lansing, Mich., assignor to the United States of America as represented by the Secretary of the Army
Filed Sept. 16, 1965, Ser. No. 487,935
Int. Cl. H04b 9/00
U.S. Cl. 250—199                                                        1 Claim

ABSTRACT OF THE DISCLOSURE

A laser system is provided which produces laser pulses of relatively long duration which pulses may be utilized to transmit high frequency intelligence information or the like. Ultrasonic cells at right angles to each other are placed within the laser cavity and receive dual, quadrature, sinusoidal electrical signals. Laser energy, derived from a photon emitter which is concentric with, and internal to, lasing material of cylindrical cross-section, reflects from a mirror and is both horizontally and vertically deflected by the ultrasonic cells. A 90° phase shifter in combination therewith causes the laser energy to move in a circle within the cavity. Upon reentering the laser material, this light beam moving in a circle overpopulates successive portions of the laser material thereby continuously changing the gradient of the refractive index within the laser cavity and thus producing relatively long laser beam emission.

---

The invention described herein may be manufactured and used by or for the Government for governmental purposes without the payment to me of any royalty thereon.

The present invention relates to a system for controlling the light pulse output of a solid state laser, and more particularly to a system of that type for controlling the pulse length of the light output therefrom.

Normally, the light from a solid state laser comes in a set of random pulses of short duration unless the laser is Q-switched, and as is known, this provides pulses of large amplitude but of relatively short duration.

The spiking or pulsing phenomena of a solid state laser is caused by the rapid relaxation of the inverted state, i.e., upon condition of lasing, the stimulated emission process rapidly reduces the population in the upper state condition. Lasing action then ceases, and does not reoccur until the population of the upper state is raised above some minimum value by the pumping or exciting lamp means.

Lasing action can be maintained if new material, with an overpopulation in the upper state, can be exchanged at a rapid rate for the material with the depleted upper state. However, it is extremely difficult to move the actual laser media at the velocities required for this rate of exchange and thus provide laser output pulses of relatively long duration as desired for the purposes above referred to.

It is therefore an object of this invention to provide an improved system for controlling the light pulse output of a solid state laser whereby the normal duration of the light output pulses of such a laser is increased.

It is a further object of this invention to provide an improved light output control system for a solid state laser which provides for continuously changing the region of a laser material which is in proper optical condition for lasing by continuously changing the gradient of refractive index within a laser cavity at a predetermined frequency.

It is also a further and important object of this invention to provide an improved laser light output control system with electroacoustical control to provide continuous material renewal and optical lasing operating at ultrasonic frequencies.

It is a still further and specific object of this invention to provide an ultrasonic signal responsive system for controlling the light pulse output of a solid state laser in frequency and duration and with enhanced light output through symmetrical pumping of the laser body.

In accordance with the invention, a laser cavity is provided with a partially-reflecting mirror at the front end and a body of laser material at the rear end spaced along the symmetrical with respect to a central axis of light propagation through the cavity. On said axis adjacent to the partially-reflecting front mirror and interposed between it and the laser body are a pair of beam deflecting units or cells of the piezoelectric type in close spaced relation to each other. The cells may be quartz blocks with an external driving signal applied along the X-crystallographic axes thereof which are placed at right angles to each other and to said propagation axis or direction of propagation of the light from the laser body. The driving signal is at a frequency which is an odd harmonic of the natural mechanical vibration of the quartz cells or blocks. The wavelength of the ultrasonic sound must be greater than the width of the light beam. The light is deflected by the gradient of refractive index produced in the quartz block by the ultrasonic wave. A 90° phase shifter is provided for one cell whereby the signal is applied to the two cells in 90° out-of-phase relation.

The light reflected from the partially-reflecting mirror is deflected horizontally by one cell and vertically by the other due to the placement of their x-axes at right angles to each other. The driving signal is generally a sinusoidal wave. The angular deflection of the light beam by each cell is thus in sinusoidal motion with the period of said wave. By driving the cells 90° out of phase the light beam moves in a circle. This passes through the laser body and thus the region thereof capable of lasing is continually and progressively created or generated as the light beam is continually deflected in the circular path. A region of the laser material which is in proper optical condition for lasing is thus continuously available as it is raised or driven from a depleted upper state condition to an overpopulated upper state condition. Successive sections of the laser body become reinverted thus during the period that the light beam makes a traverse of the laser body. The lasing action is maintained for several periods of the ultrasonic sound and the desired pulses of duration greater than the normal pulse duration of the solid state laser not embodying the beam deflecting cells is obtained.

The laser body is preferably in the form of an elongated cylinder having a hollow core or center and is symmetrical with the propagation axis. The excitation lamp is located within the hollow interior around said axis and the outer surface of the laser body can be coated to provide light reflection, whereby efficient pumping of the laser occurs as all of the lamp radiation is trapped in the system.

The invention will further be understood from the following description, when considered with reference to the accompanying drawing, and its scope is pointed out in the appended claims.

In the drawing, FIG. 1 is a schematic side view of a laser system and control circuit diagram in accordance with the invention, and FIG. 2 is an end view of the laser system showing the relation of certain parts in accordance with the invention.

Referring to the drawing wherein like parts in both figures are designated by like reference numerals, a partially-reflecting mirror 6, followed by two light-deflecting cells 7 and 8, are located in the forward or output end of a laser cavity 5 having a central axis of light propagation 9 to which the mirror surface is at a right angle or normal. At the inner end of the cavity 5 and in spaced relation to the mirror 6, along the axis of light propagation 9 and concentric therewith, is an elongated body 15 of lasing material such as ruby or properly doped glass, for example, of circular cross section and preferably in the form of an elongated cylinder as shown. This is provided with a relatively small central axial bore or opening 20 therethrough and light reflecting means surrounding said body and concentric with the axis. This may be a surface coating on the outer peripheral surface 21. Within the opening 20 and on the axis 9 is an elongated laser pumping or exciter lamp 12 having current input terminals 22 connected with a suitable current source indicated at 25 through supply leads 23 and a control switch 24 which is shown in the closed or operating position.

The forward and rear ends 10 and 11, respectively, of the laser body are curved, as indicatesd, on a radius from a center at the inner deflecting cell 8, and the surface 11 is provided with light-reflecting means such as a reflecting surface coating or is otherwise caused to reflect light like the peripheral surface 21. Thus light from the laser body along the axis 9, reflecting normally from the mirror 6, is deflected horizontally by the cell 7 and vertically by the cell 8. The angular deflection of the light produced by each cell is a sinusoidal motion as determined by the period of the applied ultrasonic signal. Hence, by driving the cells at a phase difference, such as 90°, the deflection of the light beam moves in a repetitive closed path such as the circle indicated at 19. The light from the cells passes through the glass-air interface 10 at normal incidence and is reflected from the coated rear surface 11. The reflected light traverses the same path as the incident light as indicated by the directional arrowheads placed upon the beam lines 17 and 18.

The surfaces 10, 11 and 6 can have various combinations of plane or curved surfaces with and without other optical elements placed in the space between the cell 8 and the laser media 10. The combination requires only that the light is trapped between the surfaces 11 and 6.

If the laser body 15 of ruby or doped-glass or other suitable material is properly doped to be a laser medium, lasing action can occur along the path where the light is trapped between the mirror 6 and the reflecting surface 11. The region capable of lasing is therefore continually changed as the light beam is being continually deflected in the circular or closed path through the body. By adjusting the applied ultrasonic frequency, with a predetermined laser media and also the pumping strength of the lamp 12, sections of the laser material will thus become reinverted during the period that the light beam makes a path or revolution through the body of laser material. Therefore, lasing action will be maintained for several periods of the ultrasonic signal frequency, and the duration of the lasing depends on the excitation time of the pump lamp 12. The length of the output pulses are thus increased exceeding the length of the output pulse generated by the solid state laser while not utilizing cells 7 and 8.

The symmetry of the laser system to allow symmetrical pumping or excitation of the laser material is shown more clearly in FIG. 2 or end view, whereby the reflecting surface 21 is made to provide efficient pumping of the laser body as all of the radiation is trapped in the system thereby.

The piezoelectric or electroacoustic deflection cells 7 and 8 are constructed of piezoelectric materials which are transparent to laser radiation, such as quartz, with the ultrasonic signal applied to the x-axes at a right angle to each other and to the direction of light propagation as hereinbefore referred to.

The acoustic cells 7 and 8 need not be composed entirely of piezoelectric material. They can each be a small flat piezoelectric crystal, which is operated on an odd harmonic of its natural vibration frequency, radiating ultrasonic waves into trasparent solids or liquids in an appropriate cell. The sound radiated into the solid or liquid can be either absorbed or reflected with suitable devices. The direction of radiation of the two sound beams are perpendicular to each other and to that of optical axis.

The ultrasonic signal is applied to the piezoelectric units 7 and 8 from an ultrasonic signal generator 16 through a ground-return supply circuit. In the present example this includes common ground connections 26 to which piezoelectric cells 7 and 8 are connected and provided with supply leads 27 and 28 connected respectively with a phase shift circuit 13 and the generator 16, the phase shift circuit 13 receiving signals from the generator through ground and the circuit lead indicated at 29. The signal applied to the piezoelectric cell 7 in the present example is thus 90° out of phase with the signal applied to the cell 8 to provide the circular beam deflection as hereinbefore described.

The signal generator 16 is preferably operated at a frequency which is an odd harmonic of the natural mechanical vibration frequency of the quartz or other material of which the units or cells 7 and 8 are constructed. The wave length of the sound or ultrasonic signal must be greater than the width of the light beam and the light is deflected by the gradient of reflective index produced in the quartz by the ultrasonic signal, as hereinbefore mentioned.

The useful light output is admitted through the partial-reflecting mirror 6 and is a relatively small proportion of the full output of the laser body. This output is indicated by the beam 14 which is in extension of and on the axis of propagation 9.

From the foregoing description it will be seen that the laser material is Q-switched for greater pulse amplitude and is controlled in frequency by the applied signals which give a longer pulse duration than that obtained without the use of deflecting cells 7 and 8. In this system a region or portion of the body of laser material is kept in proper optical condtion for lasing by continual change as the light beam is made to pass through the laser body in a reentrant path or circle. The light passing through the laser body is trapped between the partially-reflecting mirror 6 and the reflecting surface 11 and controlled thus for progressive movement through the body. The lasing power from the central exciter lamp is likewise radially reflected and conserved within the body by the reflecting outer cylindrical surface 21 further in accordance with the invention.

Piezoelectric light deflector means responsive to ultrasonic signals are placed within a laser cavity to change the output of the laser by continuously changing at a rapid rate the portion of the laser material that is in optical condition to maintain the lasing action. This is thus made continuous by reason of the cylindrical construction and deflection means above described and depended upon the period of the applied signal wave. Higher amplitude light output pulses of longer duration than the amplitude and duration of the light output pulses of the solid state laser not utilizing the combination of deflecting cells and reflecting outer cylinder are the result of this control system.

I claim:

1. A laser light pulse output control system comprising in combination, means providing a laser cavity having a central light propagation axis, a partial light-reflecting mirror on said axis and normal thereto at a forward or output end of said cavity, a body of lasing material in spaced relation to said mirror at the opposite end of said cavity and on said axis, an excitation lamp extending along said axis within said body for pumping light radially outwardly through said laser material, means for applying operating current to said lamp, means surrounding said body and in concentric relation to said axis for reflecting light from said lamp through said body, said laser body having forward and rear surfaces substantially normal to said axis adapted for receiving and reflecting a light beam from said mirror with normal incidence and the rear surface being adapted to reflect said received light beam along the path thereof, ultrasonic signal-responsive light-deflecting means interposed on said axis between said mirror and said laser body and more adjacent to said mirror providing beam deflection in re-entrant path about said axis at the period of applied ultrasonic operating signals consisting of two piezoelectric elements having x-crystallographic axes places at right angles to each other and to the direction of propagation of light along said axis, an ultrasonic generator for generating ultrasonic operating signals, said piezoelectric elements connected to the ultrasonic generator to receive said ultrasonic operating signals with a phase shift of 90° for one of said elements thereby providing light beam deflection in said re-entrant path in a circular motion through said body of lasing material, the light beam in said circular motion continuously and progressively changing the active lasing region in the material of said body in accordance with the applied ultrasonic signal period whereby the pulse duration of the light output thereof is greater than the pulse duration of the light output of the laser body not operated in conjunction with said ultrasonic signal-responsive light-deflecting means.

References Cited

UNITED STATES PATENTS

| | | | |
|---|---|---|---|
| 3,102,920 | 9/1963 | Sirons | 331—94.5 |
| 3,222,615 | 12/1965 | Holly | 331—94.5 |
| 3,297,876 | 1/1967 | De Maria | 250—199 |

ROBERT L. GRIFFIN, Primary Examiner
A. J. MAYER, Assistant Examiner

U.S. Cl. X.R.

331—94.5; 332—7.51